William L. Brewer, Jr.
INVENTOR.

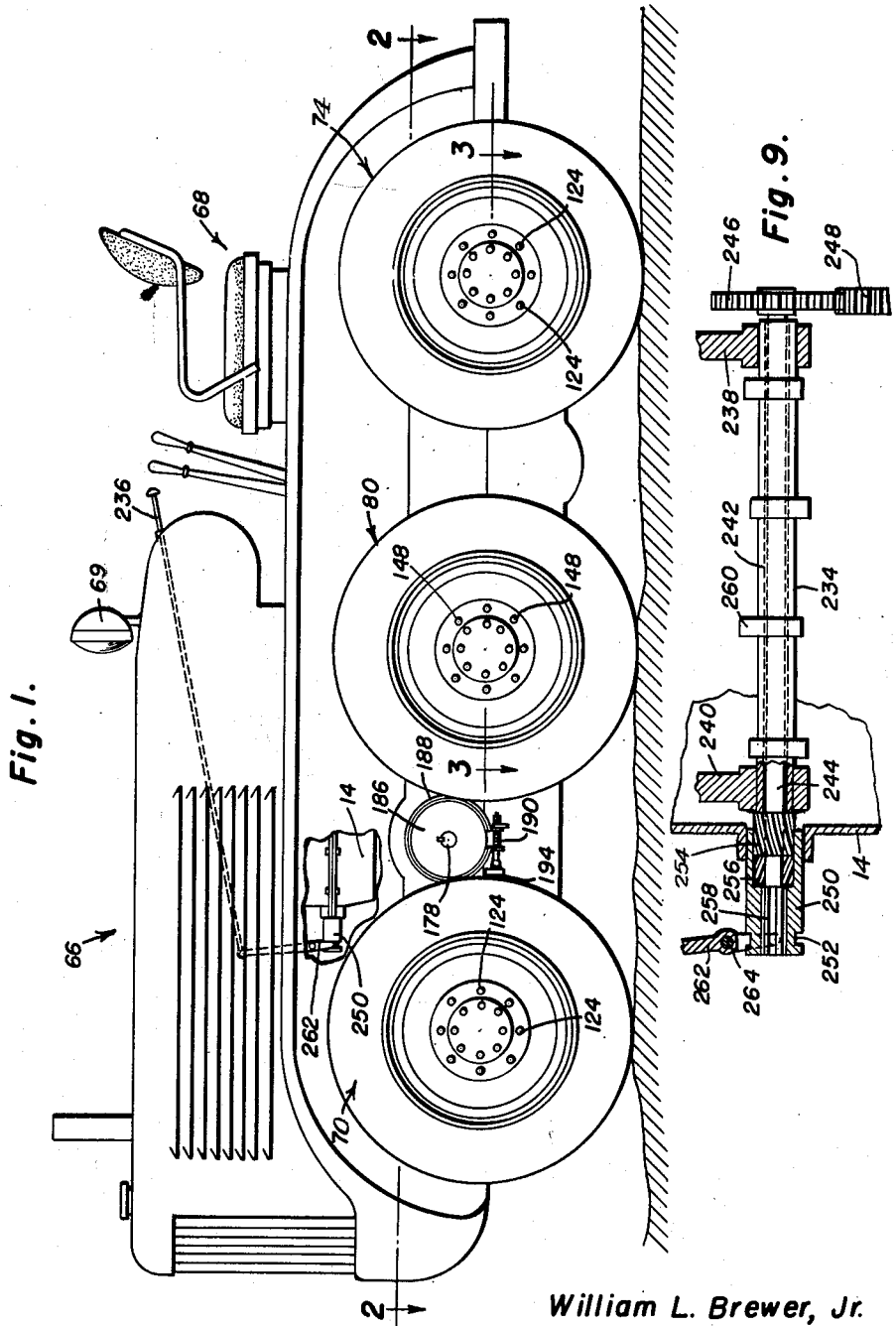

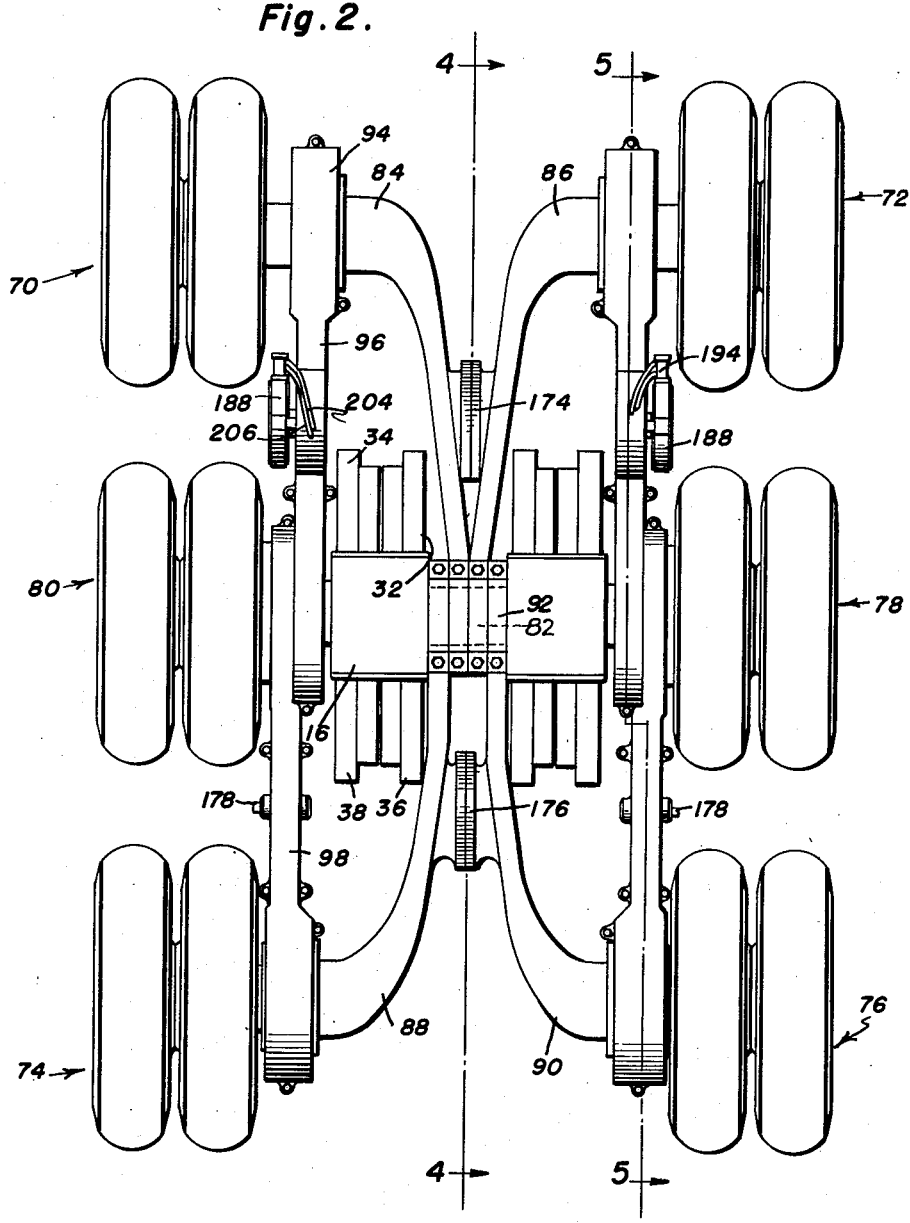

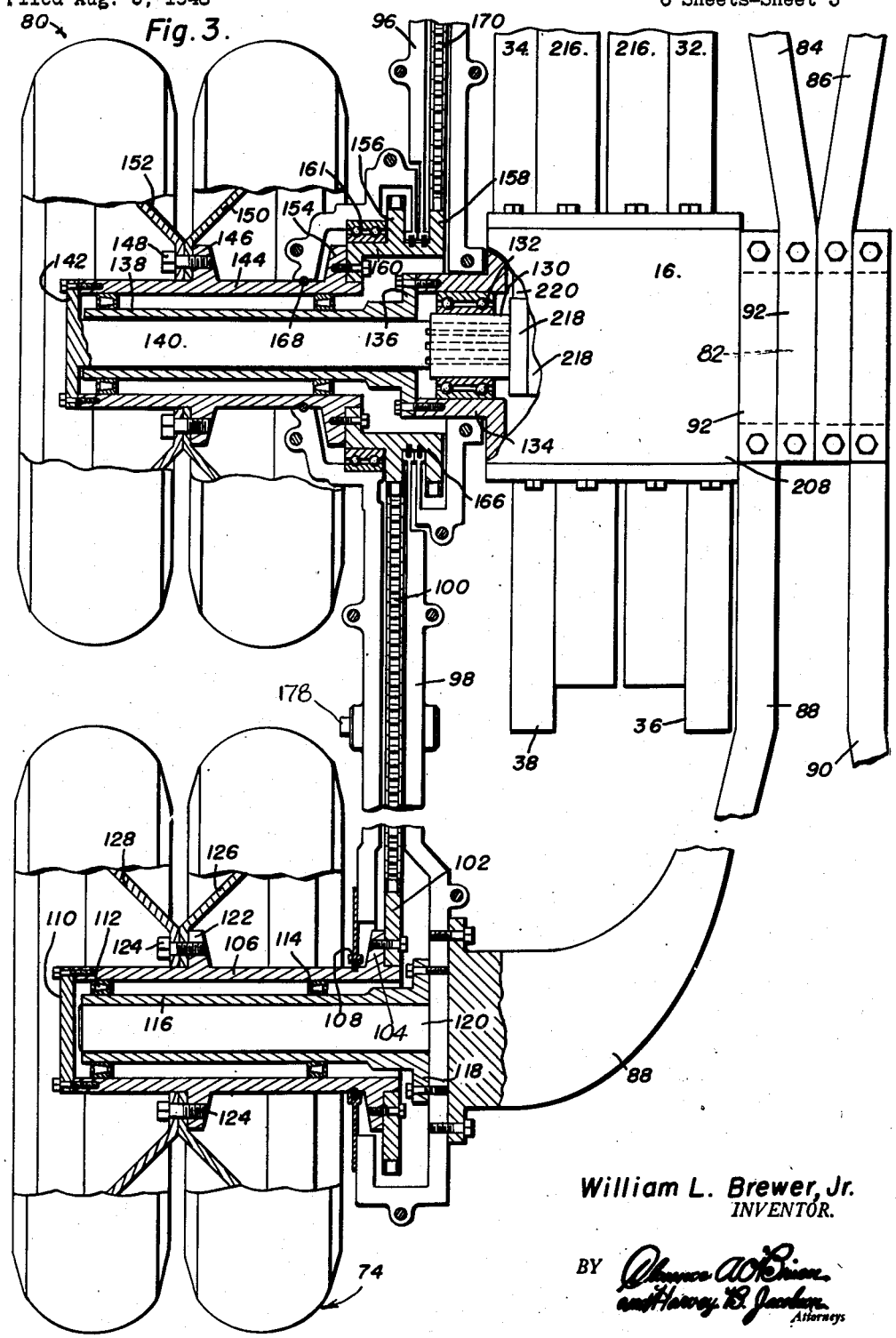

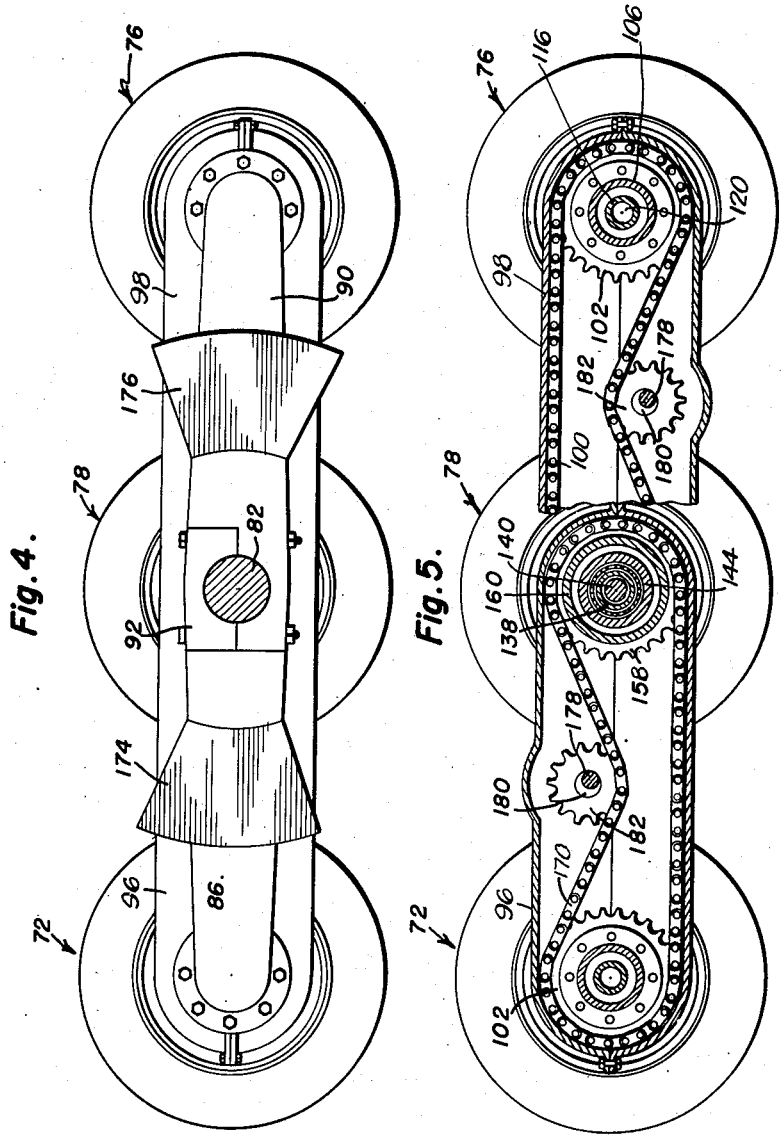

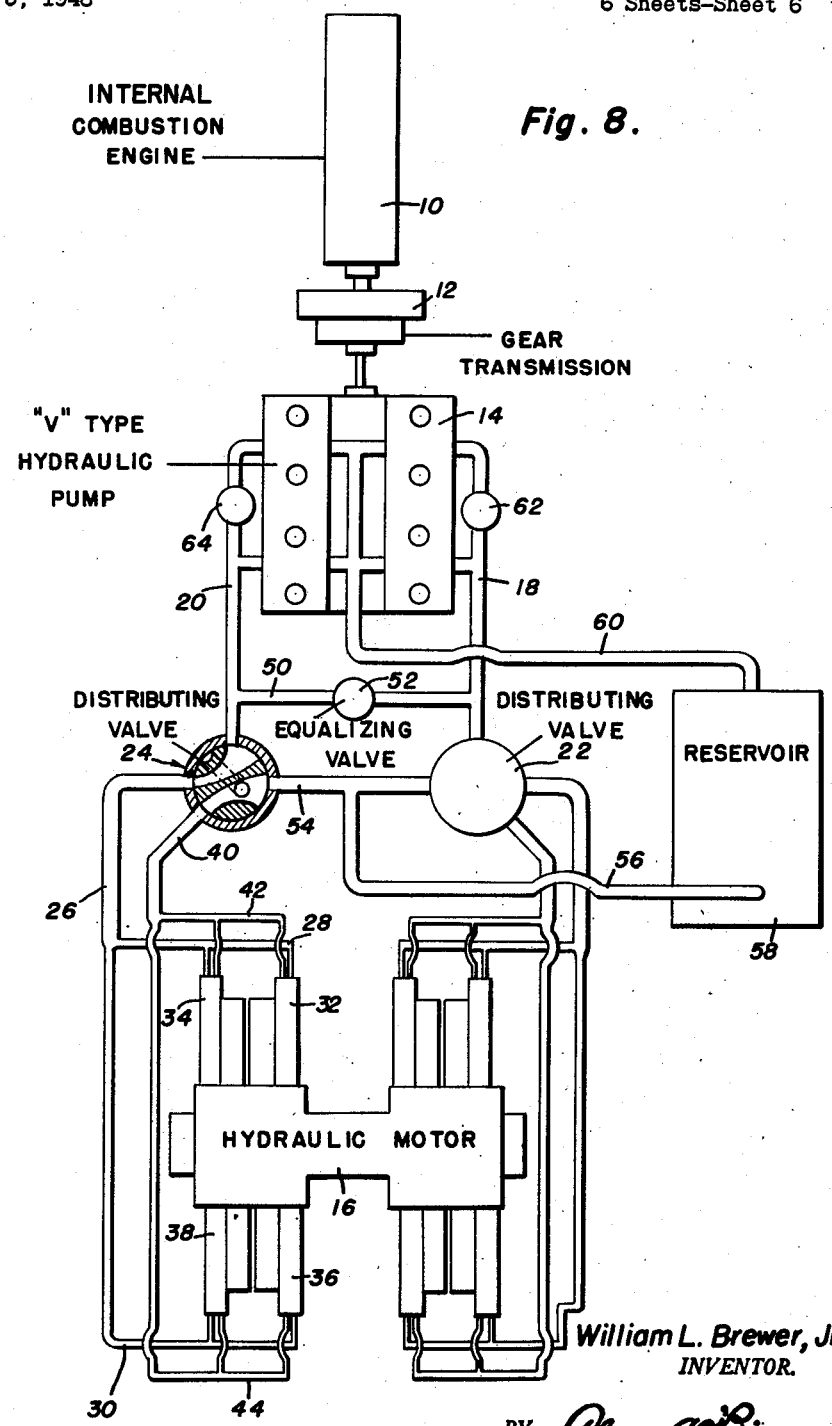

Patented June 16, 1953

2,642,144

UNITED STATES PATENT OFFICE 2,642,144

TRACTOR WITH SIX DRIVEN WHEELS

William L. Brewer, Jr., Port Townsend, Wash.

Application August 5, 1948, Serial No. 42,702

7 Claims. (Cl. 180—22)

This invention relates to novel and useful improvements in vehicles, particularly tractors.

An object of this invention is to swingingly mount a plurality of arms on a fluid motor housing assembly and to support, at the free ends of the arms, wheel assemblies.

Another object of this invention is to guide the arms in their swinging travel or movement through medium of guide members attached to each of the arms.

Another object of this invention is to drivingly mount a pair of wheeled units on the fluid motor assembly, which wheeled units cooperate with the said wheel assemblies to form a chassis of a vehicle.

Another object of this invention is to drive the wheeled units and assemblies by means of a semi-rigid or flexible drive mechanism, which includes chains operatively driven by the fluid motor, and trained around suitable gears provided on the wheel assemblies.

Another object of this invention is to supply an axle structure in connection with the wheel assemblies which includes a floating axle compensating for various exigencies such as rendering the vehicle smoothly operative as to the drive mechanism thereof over rough terrain, etc.

Ancillary objects and features of novelty will become apparent to those skilled in the art, in following the description of the preferred form of the invention, illustrated in the accompanying drawings, wherein:

Figure 1 is an elevational side view of the preferred form of the invention;

Figure 2 is a plan view of the invention, taken on the line 2—2 of Figure 1;

Figure 3 is an enlarged elevational view taken on the line 3—3 of Figure 1, portions being broken away in section to illustrate details of construction and showing particularly the wheel assembly and unit structures;

Figure 4 is a sectional view taken substantially on a line 4—4 of Figure 2 and in the direction of the arrows;

Figure 5 is a sectional view illustrating details of construction and taken substantially on a line 5—5 of Figure 2 and in the direction of the arrows;

Figure 8 is a diagrammatic view showing the fluid flow system and various pertinent elements therein, and;

Figure 9 is a sectional view showing a detail of construction and illustrative of the cam angle changing device in the pump.

Figure 6:
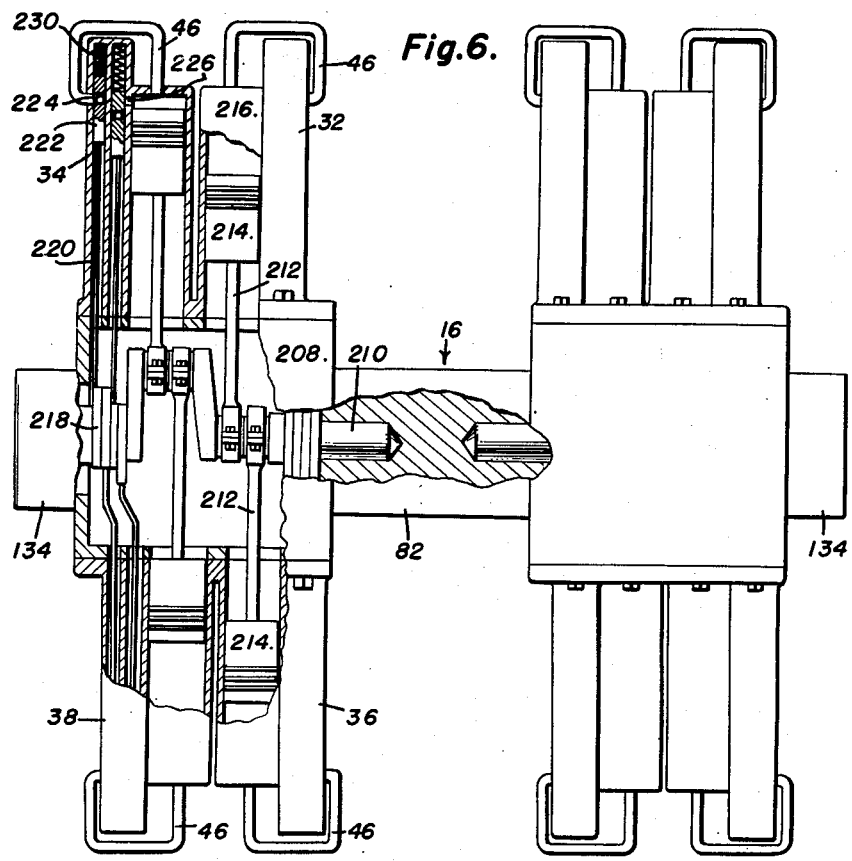
Figure 6 is a plan view of the fluid motor, portions being broken away in section to illustrate details of construction.

This invention has been developed in order to provide a device which is smoothly operative, departing from the conventional principles of vehicles and more specifically of tractors or other types of farm towing devices. With the advent of fluid actuated systems for driving or motivating vehicles and specifically, with the advent of such mechanisms having proved practical operability, various developments have been accomplished in the line of tractors for farm and other use. Such a development is incorporated in a preferred form of the present invention.

It has been found that by means of the usual gears, torque tubes and other usual means of actuating a tractor which of necessity includes transmissions, differentials, etc., it has been impractical to pivotally mount wheel assemblies of a tractor. Although not impossible, it is substantially so and very impractical to devise a drive mechanism of purely mechanical elements of rigid type yet have various wheel assemblies freely mounted for pivotal or swinging movement in a tractor.

Accordingly, by means of the fluid flow system illustrated in Figure 8, it is possible to swingingly support front and rear wheel assemblies of the tractor, obviate conventional wheel brakes and realize various beneficial results in the practical operation of the invention.

Attention is first directed to Figure 8 wherein the fluid flow system is illustrated diagrammatically. The specific structure of the actual illustrated embodiment of the invention will be more clearly understood after having considered the fluid flow system which forms a portion of the invention. An engine 10 such as the diesel or gasoline fired type is shown diagrammatically. Through the medium of a gear transmission seen at 12, a V-type hydraulic pump 14 is connected with the engine.

A hydraulic fluid motor 16 is supplied in the system and actually includes two individual units, each having a housing and connected together by a common member which constitutes a spindle 82. This hydraulic motor 16 has various conduits for inlet and exhaust of fluid under pressure from the pump 14.

The said various conduits include outlet lines 18 and 20 respectively which are operatively asterminates in a distributing valve 22 and 24 respectively. The distributing valves are manually operative in order to direct fluid from the pump in selected travels and through selected conduits.

Considering first the conduit 20 and its distributing valve 24, it will be seen that fluid is permitted to flow through the conduit or line 26 and through branch lines 28 and 30 respectively which communicate with the conduit 26. Smaller lines (unnumbered) terminate in the valve chambers 32, 34, 36, and 38 respectively.

A return line 40 is associated with the inlet side of the distributing valve 24 and has branch lines 42 and 44 respectively connected therewith. These branch lines 42 and 44 have smaller unnumbered lines extending therefrom and terminating in the valve chambers.

Attention is directed to Figure 6 wherein a number of bypasses, each of which is indicated at 46, extend from the cylinders of the fluid motor to one portion of each valve chamber. Such bypasses are necessary for the operation of the invention and more specifically for the operation of the fluid flow system.

As stated above the fluid motor is actually formed of two sections each integrally associated with each other by means of a common housing and as is seen in Figure 6 the fluid motor is of the reciprocatory type. The second section of the fluid motor which is in itself an independently operative section of the fluid motor, has an identical system of conduits associated therewith and associated with the distributing valve 22.

A first bypass 50 connects the outlet conduits 18 and 20 of the pump 14 and has an equalizing valve 52 to serve its usual and conventional function therein. A second bypass 54 connects the distributing valves 22 and 24 and has a pipe or conduit 56 in communication therewith and in communication with a reservoir or plenum chamber 58. Another conduit 60 extends from the reservoir or plenum chamber to the inlet of the main hydraulic pump.

In operation the fluid flow system is as follows:

Torque from the engine and through the gear transmission actuates the crank shaft of the V-type hydraulic pump. By means of usual and conventional intermediate structure exclusive of a particular cam shaft angle regulating mechanism, fluid is urged under pressure through the conduits 18 and 20 and also through pressure domes 62 and 64 respectively which are provided in the said lines 18 and 20. As the fluid enters the distributing valve 24 and the distributing valve 22, depending upon how the core of the distributing valve is set, the fluid will flow through each of the lines 26 which are associated with each individual unit of the hydraulic or fluid motor. When the distributing valves are so set that fluid is fed under pressure to both units of the fluid motor, the line of flow is obviously into the respective units of the fluid motor, through the return lines 40, thence through the bypass 54, line or pipe 56 into the reservoir 58 thence through the conduit 60 and into the inlet side of the V-type hydraulic pump for recirculation.

However, when one of the valves, 22 for example, is in the closed position, fluid will extend only through the distributing valve 24 thereby rendering only one unit of the fluid motor operative. Accordingly, the return flow extends through the bypass 54 and into the reservoir 58 for recirculation. Under such conditions as will appear subsequently the wheels of the vehicle which are actuated by the one operative unit of the fluid motor will tend and actually turn the entire vehicle, while the other wheels serve as idlers.

To reverse the direction of the tractor, fluid flow in the lines 26 and 40 is transposed by proper manipulation of the valves 22 and 24 (simultaneously).

Referring now to Figure 1 it will be seen that a tractor is shown and generally indicated at 66. This tractor is a typical type vehicle wherein the present invention resides. Various appurtenances contiguous to conventional tractors may be used such as the seat indicated at 68, the lamp indicated at 69 and other well known devices. Noting now Figure 2 which is in reality a view of the tractor shown in Figure 1 in plan with the body removed, it will be seen that four wheel assemblies indicated at 70, 72, 74, and 76 are swingingly mounted on the spindle 82 of the fluid motor by means of individual arms 84, 86, 88, and 90 respectively. The innermost ends of the arms have cap type bearings, each of which is indicated at 92 formed thereon thereby forming a pivotal connection between the spindle 82 and the said arms. Inspecting the arm 84 in detail it will be seen that one end thereof carries a wheel assembly 70 while the other end is swingingly mounted on the spindle 82. A gear box 94 is interposed between the wheel assembly 70 and the pivoted end of the arm 84 and has a beam 96 secured thereto. This beam is pivoted for movement with the arm 84 at a position seen in Figure 3 and which is adjacent and around the power takeoff assembly for the wheel unit 80. The opposite side of the tractor and rear of the tractor is formed in an identical manner. Thus, upon movement of the vehicle over an obstacle each of the wheel assemblies is permitted to be raised and depressed for the purpose of allowing the tractor to follow the terrain and its irregularities relatively smoothly.

Attention is now directed to Figure 3 which is illustrative of specific detail of each wheel assembly and each wheel unit. First taking the assemblies and specifically the assembly 74 it will be seen that the beam 98 which is identical to the beam 96 with a certain small exception, is in reality a hollow type member accommodating a chain 100. This chain extends around a sprocket type gear 102 closely associated with the wheel assembly 74. This gear 102 is attached to a peripheral flange 104 of a sleeve type hub 106 for rotation therewith. Screws or the like may be used in this attaching connection. Further, an oil seal 108 of conventional description may be used in association with the sleeve type hub.

An end cap 110 is secured to the said sleeve type hub thereby defining a closed chamber which accommodates anti-friction bearings 112 and 114 respectively. On the inner race of the antifriction bearings there is supplied a hollow shaft 116 which has a flange 118 at the end thereof rigidly attached to the beam 98 through the medium of screws. The arm 88 being also attached to this beam by means of screws has the said hollow shaft 116 movable therewith, upon swinging movement of the arm 88 about the spindle 82 as an axis.

If it is found desirable a spindle 120 may be supplied within the hollow shaft and attached to the beam 98 for rigidity purposes.

The said sleeve type hub 106 has a peripheral flange 122 integral therewith accommodating wheel lugs 124. The said wheel lugs extend through suitable apertures provided in the wheel framings 126 and 128 of each individual wheel. It is quite apparent that either one or two wheels may be used in association with each wheel assembly, as found desirable. Further, it is readily apparent that the removal of wheels for various and sundry purposes is extremely simple, it requiring only the removal of the lugs 124.

It is appreciated that if the chain or other semi-rigid driving member 100 is live, rotation will be imparted to the sleeve type hub 106 which rides on the anti-friction bearings of the hollow shaft 116. This in turn axially rotates the wheels in each assembly.

Referring now to the wheeled unit shown at 80, it is appreciated that the fluid motor 16 clearly discloses an internally splined drive shaft 130 extending from the side thereof. This splined drive shaft seats on the inner race of an anti-friction bearing 132 of conventional description. The said anti-friction bearing also rests by means of its outer race on a boss 134 formed in the housing of the fluid motor 16.

Attached to the boss 134 by means of a flange 136 and suitable bolts, is a hollow shaft 138. This hollow shaft has a floating axle 140 slidably received therein which has splines at the end thereof. These splines fit in the said hollow power takeoff shaft 130 and are matched in such a manner whereby the said shaft 140 may simply be slidably received therein. The end of the shaft 140 opposite the said splines has a cap 142 either integral therewith or rigidly secured thereto, which is in turn secured to a sleeve type hub 144. The said above type hub has a lug receiving flange 146 integral therewith and a plurality of lugs 148 in suitable apertures, which are threaded, supplied for that purpose. Wheel metallic portions 150 and 152 respectively are maintained firmly in place on the flange 146 by means of the said lugs penetrating suitable apertures provided therein.

The innermost end of the said sleeve type hub 144 has a flange 154 formed integral therewith in order to accommodate a pair of gears 156 and 158 respectively through the intermediate structure of the common hub 160 of both of said gears.

The inermost portion of the beam 98 is formed as a small housing covering the gear 156 but spaced from the gear 158. An anti-friction bearing 161 is interposed between this end of the beam 98 and the gear common hub 160. The said semi-rigid driving element 100 which in this case is a chain not only extends around the gear 102 in the wheel assembly 74 but also around the gear 156 of the wheel unit 80. Consequently, torque derived from the fluid motor is imparted to the shaft 140, through the sleeve type hub 144 and, to the wheels of the wheeled unit. Also rotatable with the sleeve type hub 144 is a common hub for both gears 156 and 158. Accordingly, the said chain 100 is actuated simultaneously with the wheel unit and it necessarily follows that the wheel assembly 74 will also be actuated. It will be noted at this point that wherever it is found desirable conventional oil seals and gasket may be supplied such as between the gears 156 and 158. Here a bank of oil seal wipers 166 are attached to the ends of the beams 96 and 98 respectively.

Since the beams 96 and 98 respectively must be pivotally movable a plurality of ball bearings 168 may be supplied in a suitable recess and groove between the sleeve type hub 144 and the pertinent inner ends of the beams.

The gear 158 serves the function of transmitting torque from the fluid motor 16 to the front wheel assembly 70, through the utility of a chain 170 which is identical to the said chain 100. Since the gears 156 and 158 are formed as an integral unit it is apparent that the said front wheel assembly 70 and the said back wheel assembly 74 moves simultaneously and at the same speed.

Referring to Figure 4 it will be seen that the arms 86 and 90 have guide members 174 and 176 respectively attached thereto. These guide members are in the form of plates. Each arm 84, 86, 88 and 90 respectively has one of these plates thereon and as is seen in Figure 2 pairs of said plates engage each other for sliding contact, thus serving the purpose to limit or restrict the travel of the arms to that of pivotal movement in a vertical plane about the spindle 82.

Looking now at Figure 5 it will be seen that the beams have small shafts 178 journaled therein with a cam 180 attached to each small shaft. The said cam 180 mounts a rotating member or gear 182 in an eccentric manner and this rotating member or gear 182 is drivingly engaged and contacted by the pertinent chains. Thus, by means of turning the small shaft 178 a selected amount the cam 180 is moved therewith. It is apparent that if a loose fit is provided between the cam 180 and the central opening of the gear 182, the said gear is raised and lowered thereby tightening or loosening the chain as desired.

Figure 7:
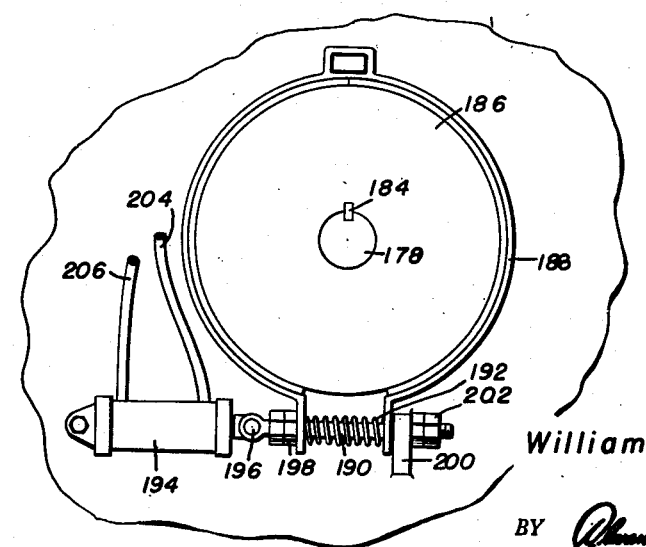
Figure 7 is an enlarged detail of construction showing the brake mechanism used in conjunction with and forming a part of the invention.

Noting Figure 7 it will be seen that one of the small shafts 178 has a keyway therein and a pin 184 seated in said keyway. This pin also seats in a brake drum 186 which has a brake band 188 extending therearound and anchored at the top portion thereof. This brake band is of conventional character including linings. The ends of the band 188 have a pin 190 extending therethrough and a spring 192 interposed therebetween. Conventional brake actuation type hydraulic cylinder 194 has its piston rod attached by means of a pivotal connection 196 to the rod 190. Suitable lock nuts 198 are secured to the rod 190 and bear on one of the ends of the brake band 188. Upon movement of the rod 190 it is apparent that the brake band end engages the lock nuts thereby tightening the brake band on the drum, if the opposite end of the brake band is anchored firmly. In order to so anchor the brake band end in question, a small bracket 200 is suitably positioned on the pertinent beam and has the rod 190 extending therethrough. Lock nuts 202 may be attached adjacent the end of the rod 190 thereby forming an adjustment. Suitable hoses 204 and 206 may be associated with the cylinder 194 in order to energize the brake actuation cylinder.

Noting Figure 6 it will be seen that the fluid motor is illustrated in detail. The two separate and independent units cooperating to form one actual motor serve the assemblies 74, 70; unit 80 and assemblies 72, 76 and unit 78 respectively. Each sub-unit of the fluid motor 16 is encased in a housing 208 attached together by means of the spindle 82. Separate crank shafts 210 are provided for each sub-unit and connecting rods 212 having piston heads 214 thereon are reciprocatively positioned in cylinders 216. Adjacent each cylinder is one of the valve chamber stacks seen in Figure 8.

Mounted on the crank shaft is a number of cams, each of which is seen at 218 and push rods 220 have one end of each thereof slidably received on the cams. The oposite end of the push rods engage and actuate a valve head 222 which has a port 224 therein. There is also provided a port 226 adjacent the upper portion of each cylinder in order to allow ingress and egress of fluid from the cylinder.

During a single cycle of operation of the fluid motor, the valves (due to the shapes of the cams) are urged in the port 226 opening and closing position thereby allowing the fluid to be introduced into the cylinder and exhausted therefrom by normal operation of the pistons. Of course, suitable springs 230 may be used in conjunction with the valves in order to maintain the push rods firmly engaged with the surfaces of the cams 218 and in order that the valve heads 222 may react on and against the springs.

In reality each valve stack is divided into two valve chambers there being two valves for each cylinder in order that the operation of the fluid motor may be substantially identical to an ordinary reciprocating type pump.

Referring now again to the main pump which is of the V-type and which is seen at 14 there is provided a cam shaft 234, and of course a crank shaft as well as pistons and valves. The said crank shaft, cam shaft, valves and pistons are all conventional in this type of pump, however, there is provided manually operative means for regulating the angle of the crank shaft and cam shaft relative to each other. By such adjustment the timing of the valves is selectively regulated thereby rendering the pump one which has a variable output as controlled by the link 236.

The said cam shaft 234 is mounted in suitable bearing supports 238 and 240 respectively which is an integral part of the pump 14 and has in its makeup a sleeve 242 with a central shaft 244 concentric therewith. The said central shaft 244 has a gear 246 at one end thereof enmeshed with the second gear 248, the gears forming a portion of the timing mechanism, correlating the actuation of the crank shaft (unshown) of the pump 14 and the cam shaft.

A sleeve 250 having a groove 252 extending peripherally therearound adjacent but not at one end thereof is threadedly received on an externally threaded collar 254 of the sleeve 242. This externally threaded collar has its threads angularly disposed and the said sleeve has a bore and counterbore, the counterbore being complementally threaded at 256. The said bore of the sleeve is splined as seen at 258 in order to accommodate the splines of the shaft 244.

It is readily appreciated that upon sliding movement of the sleeve 250 axially relative to the central shaft 244, the sleeve 242 which has the cams 260 thereon will be rotated without movement of the central shaft 244.

The means for slidably actuating the said sleeve 250 is seen particularly well in Figures 1 and 9 as inclusive of a bifurcated link 262 mounted on a suitable pivot pin 264 and having a pin (unnumbered) therein which is received in the said groove 252. At the end opposite the bifurcations there is a pivotal connection for the said link 236 which renders it possible to axially slide the sleeve 250 upon reciprocatory movement of the link or rod 236.

By the various manipulations described in conjunction with the fluid flow apparatus, the wheel assemblies and units may be set in motion in order to operate the vehicle or tractor. One bank of wheels may be stopped in order to turn the vehicle through the medium of the brake mechanism described hereinbefore. Further, the slack in the chains forming a portion of the drive mechanism may be taken up by means of the eccentrically mounted rotatable member also described above. The speed of the entire vehicle is regulated by adjustment of the cam angle relative to the crank shaft angle as also described.

From the foregoing it is apparent that one embodiment of the invention is set forth. However, it is within the purview of the present invention to utilize various other expedients and accordingly limitation is sought only in accordance with the scope of the following claims.

Having described the invention, what is claimed as new is:

1. In a vehicle, a chassis which includes a motor assembly, said motor assembly including two units which are transversely spaced apart and rigidly connected at their inner sides by a horizontal transverse extending spindle, each unit being encased in a housing, aligned transverse shafts extending from said units, a wheel assembly carried by each of said aligned shafts, arms extending fore and aft of the vehicle and pivotally mounted in a vertical plane at their inner ends on said spindle, and each arm having a wheel assembly at the outer end thereof.

2. The combination of claim 1 and a beam operatively connected with the outer end of each arm and pivotally carried by said aligned shaft.

3. The combination of claim 1 and guide plates slidingly disposed on each other and secured to adjacent arms to guide the arms when they are pivotally actuated.

4. The combination of claim 1 and guide plates slidingly disposed on each other and secured to adjacent arms to guide the arms when they are pivotally actuated to assist in preventing lateral displacement of said arms, and a beam operatively connected with the outer end of each arm and extending toward said motor assembly and pivotally carried by said aligned shafts.

5. The combination of claim 1 and a beam operatively connected with the outer end of each arm and pivotally carried by said aligned shafts, and means disposed in said beams drivingly connecting the wheel assembly on each of said aligned shafts and the corresponding adjacent forward and rearward wheel assemblies carried by said arms.

6. The combination of claim 1 and a beam operatively connected with the outer end of each arm and pivotally carried by aligned shafts, means disposed in said beams drivingly connecting the wheel assembly on each of said aligned shafts and the corersponding adjacent forward and rearward wheel assemblies carried by said arms and other means operatively connected with said arms for guiding said arms when they are pivotally moved.

7. In a vehicle, a chassis, a motor assembly comprising two motor units, each unit having a housing provided with a shaft extending from one end thereof, said shafts being in alignment with one another and transverse to the chassis, a spindle located intermediate said aligned shafts and connecting said housings together, said spindle holding said housing and said units transversely spaced apart and rigidly connected at their inner sides, curved arms secured at their inner ends to said spindle by a pivotal connection, said curved arms being pivotal in vertical planes, said curved arms extending fore and aft of the vehicle, a wheel assembly for each of said arms, each wheel assembly mounted at the outer extremity of each of said arms, a wheel unit disposed on each of said aligned shafts, each wheel unit being disposed between said wheel assemblies on said curved arms, means drivingly connecting each of said units and its associated wheel assemblies, and a beam forming a housing for said last mentioned means and carried by one of said arms and one of said aligned shafts.

WILLIAM L. BREWER, JR.

References Cited in the file of this patent

UNITED STATES PATENTS

| Number | Name | Date |
|---|---|---|
| 651,158 | Bergmann | June 5, 1900 |
| 1,179,736 | Manly | Apr. 18, 1916 |
| 1,423,386 | Bair | July 18, 1922 |
| 1,606,707 | Johnson et al. | Nov. 9, 1926 |
| 1,608,069 | Lacey et al. | Nov. 23, 1926 |
| 1,644,978 | Childers | Oct. 11, 1927 |
| 1,751,394 | Christie | Mar. 18, 1930 |
| 1,802,366 | Adamson | Apr. 28, 1931 |
| 1,817,028 | Brockway | Aug. 4, 1931 |
| 2,082,001 | Hanson | June 1, 1937 |
| 2,266,491 | Larison | Dec. 16, 1941 |
| 2,425,089 | Diaz | Aug. 5, 1947 |

FOREIGN PATENTS

| Number | Country | Date |
|---|---|---|
| 517,078 | France | Apr. 29, 1921 |